US008515126B1

(12) United States Patent
Medasani et al.

(10) Patent No.: US 8,515,126 B1
(45) Date of Patent: Aug. 20, 2013

(54) MULTI-STAGE METHOD FOR OBJECT DETECTION USING COGNITIVE SWARMS AND SYSTEM FOR AUTOMATED RESPONSE TO DETECTED OBJECTS

(75) Inventors: Swarup Medasani, Thousand Oaks, CA (US); Yuri Owechko, Newbury Park, CA (US); Michael Daily, Thousand Oaks, CA (US); Ronald Azuma, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1098 days.

(21) Appl. No.: 12/456,558

(22) Filed: Jun. 18, 2009

Related U.S. Application Data

(63) Continuation-in-part of application No. 11/800,264, filed on May 3, 2007.

(51) Int. Cl.
*G06K 9/00* (2006.01)

(52) U.S. Cl.
USPC ............ 382/103; 382/100; 382/155; 382/227

(58) Field of Classification Search
USPC .................................. 382/103, 227, 100, 155
See application file for complete search history.

(56) References Cited

U.S. PATENT DOCUMENTS

| | | | |
|---|---|---|---|
| 6,178,141 B1 | 1/2001 | Duckworth et al. | |
| 6,621,764 B1 | 9/2003 | Smith | |
| 7,046,187 B2 | 5/2006 | Fullerton et al. | |
| 7,066,427 B2 | 6/2006 | Chang | |
| 7,104,496 B2 | 9/2006 | Chang | |
| 7,110,569 B2 * | 9/2006 | Brodsky et al. | 382/103 |
| 7,135,992 B2 | 11/2006 | Karlsson et al. | |
| 7,139,222 B1 | 11/2006 | Baxter et al. | |
| 7,151,478 B1 | 12/2006 | Adams et al. | |
| 7,190,633 B2 | 3/2007 | Brinn et al. | |
| 7,266,045 B2 | 9/2007 | Baxter et al. | |
| 7,292,501 B2 | 11/2007 | Barger | |
| 7,359,285 B2 | 4/2008 | Barger et al. | |
| 7,408,840 B2 | 8/2008 | Barger et al. | |
| 7,586,812 B2 | 9/2009 | Baxter et al. | |

(Continued)

OTHER PUBLICATIONS

S. A. Holmes, G. Klein and D. W. Murray, "An O(N∧2) Square Root Unscented Kalman filter for Visual Simultaneous Localization and Mapping", IEEE Transactions on Pattern Analysis and Machine Intelligence, Jul. 2009.

(Continued)

*Primary Examiner* — Matthew Bella
*Assistant Examiner* — Julian Brooks
(74) *Attorney, Agent, or Firm* — Tope-McKay & Assoc.

(57) ABSTRACT

A multi-stage method of visual object detection is disclosed. The method was originally designed to detect humans in specific poses, but is applicable to generic detection of any object. A first stage comprises acts of searching for members of a predetermined general-class of objects (such as humans) in an image using a cognitive swarm, detecting members of the general-class of objects in the image, and selecting regions of the image containing detected members of the general-class of objects. A second stage comprises acts of searching for members of a predetermined specific-class of objects (such as humans in a certain pose) within the selected regions of the image using a cognitive swarm, detecting members of the specific-class of objects within the selected regions of the image, and outputting the locations of detected objects to an operator display and optionally to an automatic response system.

34 Claims, 16 Drawing Sheets

(56) References Cited

U.S. PATENT DOCUMENTS

| | | | |
|---|---|---|---|
| 7,599,252 | B2 | 10/2009 | Showen et al. |
| 7,599,894 | B2* | 10/2009 | Owechko et al. ............... 706/14 |
| 7,636,700 | B2* | 12/2009 | Owechko et al. ............... 706/46 |
| 8,098,888 | B1* | 1/2012 | Mummareddy et al. ...... 382/103 |
| 8,285,655 | B1* | 10/2012 | Medasani et al. ............... 706/14 |
| 2005/0100192 | A1* | 5/2005 | Fujimura et al. ............. 382/103 |
| 2005/0182518 | A1 | 8/2005 | Karlsson |
| 2005/0196047 | A1* | 9/2005 | Owechko et al. ............. 382/224 |
| 2005/0238200 | A1 | 10/2005 | Gupta et al. |
| 2007/0019865 | A1* | 1/2007 | Owechko et al. ............. 382/224 |
| 2007/0090973 | A1 | 4/2007 | Karlsson et al. |
| 2007/0183669 | A1* | 8/2007 | Owechko et al. ............. 382/224 |
| 2007/0183670 | A1* | 8/2007 | Owechko et al. ............. 382/224 |
| 2007/0263900 | A1* | 11/2007 | Medasani et al. ............. 382/103 |
| 2008/0033645 | A1 | 2/2008 | Levinson et al. |
| 2009/0290019 | A1 | 11/2009 | McNeilis et al. |

OTHER PUBLICATIONS

Thomas Lemaire, Cyrille Berger, Il-Kyun Jung and Simon Lacroix, "Vision-Based SLAM: Stereo and Monocular Approaches", International Journal of Computer Vision, Sep. 2007.

M. Kaess and F. Dellaert, "Probabilistic Structure Matching for Visual SLAM with a Multi-Camera Rig", Computer Vision and Image Understanding, vol. 114, Feb. 2010, pp. 286-296.

Georg Klein and David Murray, "Parallel Tracking and Mapping for Small AR Workspaces", In Proc. International Symposium on Mixed and Augmented Reality 2007.

WeaponWatch by Radiance Technologies http://www.radiancetech.com/products/weaponwatch.htm.

Robot Enhanced Detection Outpost with Lasers (REDOWL) by iRobot Corporation http://www.irobot.com/sp.cfm?pageid=86&id=170.

Kennedy, J., Eberhart, R.C., and Shi, Y., "Swarm Intelligence," San Francisco: Morgan Kaufmann Publishers, 2001, chapter 7, pp. 287-326.

Kennedy, J., Eberhart, R.C., and Shi, Y., "Swarm Intelligence," San Francisco: Morgan Kaufmann Publishers, 2001, chapter 8, pp. 327-369.

R.C. Eberhart and Y. Shi, "Particle Swarm Optimization: Developments, Applications, and Resources," IEEE congress on evolutionary computation, CEC 2001, Seoul, Korea.

\* cited by examiner

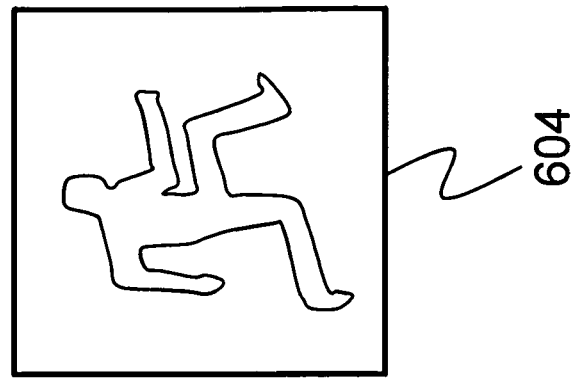
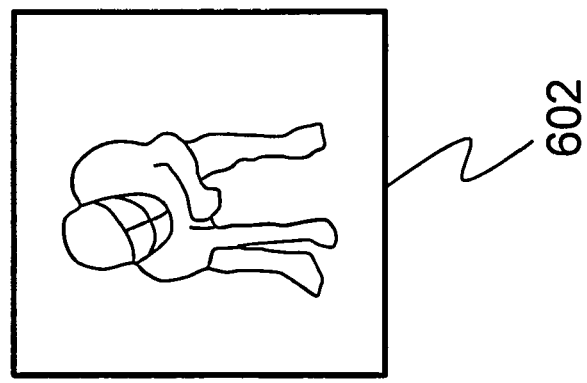
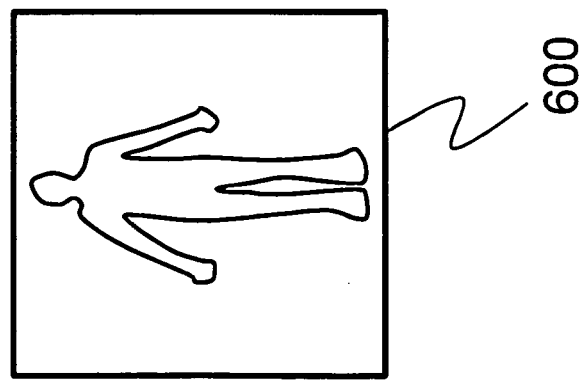
FIG. 6

MULTI-STAGE METHOD FOR OBJECT DETECTION USING COGNITIVE SWARMS AND SYSTEM FOR AUTOMATED RESPONSE TO DETECTED OBJECTS

CROSS-REFERENCE TO RELATED APPLICATIONS

This application is a Continuation-in-Part application of U.S. application Ser. No. 11/800,264, filed on May 3, 2007, entitled, "Behavior recognition using cognitive swarms and fuzzy graphs,"

STATEMENT OF GOVERNMENT INTEREST

This invention was made with Government support under Contract No. FA9453-05-C-0252, awarded by the Defense Advanced Research Projects Agency. The Government has certain rights in the invention.

BACKGROUND OFT HE INVENTION (1) Field of Invention

The present invention relates to a method and system for visual object detection and response and, more specifically, to a multi-stage method for generic object detection using cognitive swarms and a system for automated response to the detected objects.

(2) Description of Related Art

Current methods of object detection focus on direct detection of the desired class of objects by searching the entire image window. Such methods substantially fail in detecting highly specific objects, such as a narrow specific-class of a more general-class of objects. A traditional search for a highly specific object, for example, a person in a pose with their arms held vertically upward as would a football referee signaling a touchdown, would require a feature detection algorithm specifically tailored to detecting a person in such a pose. There currently exist object detection algorithms for detecting a human form. Tailoring these algorithms to detect a human form engaged in a specific position would likely be very complex, thereby increasing processing time without a guarantee of accurate results. Such a method is also impractical if the object detection task changes which would require creation of a different highly specific object detection algorithm. As an alternative to creating a highly specific detection algorithm, one could search for the simple double vertical signatures created by the arm position of the object. However, such a method will likely yield a high false alarm rate since it will detect all similar vertical signatures in the scene, including signatures from trees, buildings, and other irrelevant objects.

Thus, a continuing need exists for a method for fast and accurate detection of highly specific objects in large volumes of video imagery.

SUMMARY OF INVENTION

The present invention relates to a method and system for visual object detection and response and, more specifically, to a multi-stage method for generic object detection using cognitive swarms and a system for automated response to detected entities. A first stage comprises searching for members of a predetermined general-class of objects in an image using a cognitive swarm, detecting members of the general-class of objects in the image, and selecting regions of the image containing detected members of the general-class of objects. A second stage comprises searching for members of a predetermined specific class of objects within, the selected regions using a cognitive swarm, and detecting members of the specific-class of objects within the selected regions of the image, whereby members of the specific-class of objects are located in the image.

In another aspect, the method further comprises an act of cueing an operator with the locations of detected members of the specific-class of objects.

In another aspect, the method further comprises an act of cueing an automatic response system with the locations of detected members of the specific-class of objects.

In yet another aspect, the general-class of objects is humans and the specific-class of objects is humans in a specific pose.

As can be appreciated by one skilled in the art, the present invention also comprises a data processing system having a memory and a processor, the data processing system including computer-readable instructions for causing the data processing system to search for members of a predetermined general-class of objects in an image using a cognitive swarm, detect members of the general-class of objects in the image, select regions of the image containing detected members of the general-class of objects, search for members of a predetermined specific-class of objects within the selected regions using a cognitive swarm, and detect members of the specific-class of objects within the selected regions of the image.

In another aspect, the data processing system is flintier configured to output locations of detected members of the specific-class to an operator display unit.

In yet another aspect, the data processing system is further configured to output locations of detected members of the specific-class to an automatic response system.

The present invention further comprises a complete system for object detection comprising at least one optical sensor for imaging a scene, a data processing sub-system as described above further configured to receive at least one image from the at least one optical sensor, and an operator display sub-system configured to receive locations of detected members of the specific-class of objects from the data processing sub-system and alert an operator to the locations of the detected members of the specific-class of objects.

In yet another aspect of the system, the operator display sub-system comprises a display means selected from a group consisting of illuminating the object, displaying the object location through personal head-worn displays, and displaying the object location on a flat panel display.

In another aspect of the system, the at least one optical sensor comprises a plurality of optical sensors, the data processing subsystem comprises a network of data processors configured to process the images from the plurality of optical sensors in parallel, and the network of data processors are connected with a master processor for coordinating results from the network of data processors.

In yet another aspect, the system further comprises an automatic response sub-system configured to receive locations of detected members of the specific-class of objects from the data processing sub-system.

As can be appreciated by one skilled in the art, the present invention thither comprises a computer program product having computer readable instructions encoded thereon for causing a data processing system to perform the acts of the method of the present invention as previously described.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a set of illustrations showing example poses for use with the specific-class classification stage;

DETAILED DESCRIPTION

Figures 1A, 1B:
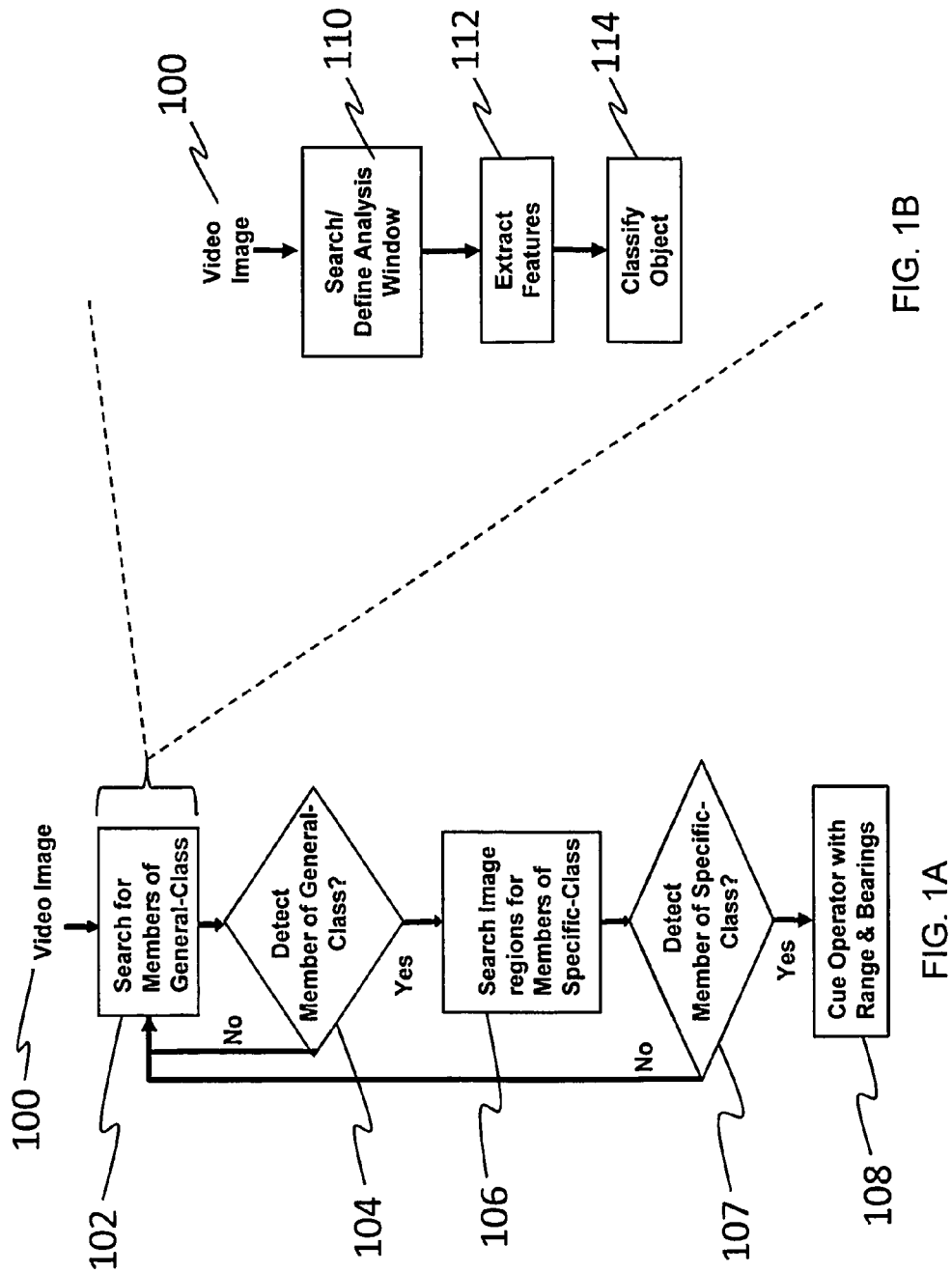
FIG. 1A is a flow diagram showing the method of the present invention.
FIG. 1B is a flow diagram showing a method of object detection for use with the present invention.

The present invention relates to a method and system for visual object detection and response and, more specifically, to a multi-stage method for generic object detection using cognitive swarms and a system for automated response to the detected objects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings may be replaced, by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112: Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

The present invention generally relates to a method and system for visual object detection and response. More specifically, the present invention is directed to a multi-stage method for generic object detection using cognitive swarms and a system for automated response to the detected objects. For ease of understanding, the following description is divided into two major sections, the first major section, labeled "(2.0 Visual Object Detection of Highly-Specific. Objects," describes the two-stage search process by which highly-specific objects can be detected in a visual image. The subsequent major section labeled "(3.0) System for Automated Response to Detected Objects," describes the surrounding system that relays the results of the detection search to operators in a manner that would allow them to take appropriate responsive action and, optionally, to an automatic response system designed to respond automatically.

(2.0) Visual Object Detection of Highly-Specific Objects

As noted above, the present invention includes a multi-stage method of object detection. In particular, the method was designed as an aid in video surveillance for detecting humans engaged in specific activities. However, the methods and processes of the present invention can be applied to generic object detection of any desired class of objects. Therefore, the embodiments described herein for detecting human activities are non-limiting examples that are provided for illustrative purposes only.

FIG. 1A is a flow diagram showing the method of the present invention with respect to generic object detection. In the first stage, a video image 100 is searched for members of a predetermined general-class of objects 102. The search may be performed using any of a variety of object detection algorithms known in the art. When a member of the general-class of objects is found 104, the portion of the image containing the general-class member is sent to a second stage classifier where the image portion is searched for members of a predetermined specific-class of objects 106. It should be noted that additional search stages beyond the two stages shown may be used if greater search specificity is required. If members of the specific-class are found 107 in the image portions, an operator is cued or alerted as to the location of the objects 108. If not, the image is further searched for potential general-class members 102. The advantage of the two-stage approach is three-fold: (1) only regions already identified as containing members of the general-class will be searched for members of the specific-class, which reduces the false alarm rate; (2) the classifier which detects the specific-class has a more narrowly defined task which improves the detection accuracy; and (3) searching for members of the specific-class only within regions containing members of the general-class uses far fewer computational resources than searching for the members of the specific-class directly over the entire image.

Compared to conventional methods, the two-stage object detection method provides much faster object detection capabilities, as well as the ability to detect an object based on the context of its surroundings. For example, the system is capable of detecting the pose of the person holding a small object when the object itself is too small to be detected directly. The conventional processing flow for recognition of objects in images or video using computer vision consists of three steps, as shown in FIG. 1B. In the first step 110, an analysis window is defined to select the portion of the video image 100 that is to be analyzed for the presence or absence of the object of interest. The analysis window is scanned or otherwise positioned at various locations in the image 100 in order to find, objects. In the second step 112, features are extracted from the analysis window that in some way are descriptive of the object of interest. A common type of feature is the inner-product of the analysis window with a two-dimensional (2-D) kernel function. A set of feature values from different locations in the analysis window, each of which may use a different kernel function, are combined into a feature vector. The third step 114 comprises the classification of the feature vector as representing an object of interest or non-object of interest. These three steps comprise the first stage 102 of the present invention.

The search or window positioning stage 110 of the specific object detection system can be implemented using cognitive swarms, which is based on Particle Swarm Optimization (PSO). PSO is known in the art and was described by Kennedy, J., Eberhart, R. C., and Shi, Y. in "*Swarm intelligence*," San Francisco: Morgan Kaufmann Publishers, 2001. PSO was also described by R. C. Eberhart and Y. Shi in "Particle Swarm Optimization: Developments, Applications, and Resources." 2001. Cognitive swarms are a new variation and extension of PSO. Cognitive swarms search for and recognize objects by combining PSO with an objective function that is based on the recognition confidence. A previous patent application has been filed on cognitive swarms for single-stage detection. The details of the cognitive swarm framework are disclosed in U.S. patent application Ser. No. 11/367, 755, titled "Cognitive Swarm Vision Framework with Attention Mechanisms," which is incorporated by reference as though fully set forth herein.

PSO is a relatively simple optimization method that has its roots in artificial life in general, and to bird flocking and swarming theory in particular. Conceptually, it includes aspects of genetic algorithms and evolutionary programming. A population of potential solutions is maintained as the positions of a set of particles in a solution space where each dimension represents one solution component. Each particle is assigned a velocity vector and the particles then explore cooperatively the solution space in search of the objective function optima. Each particle keeps track of its coordinates in multi-dimensional space that are associated with the best solution (p) it has observed so far. A global best parameter ($p_g$) is used to store the best location among all particles. The velocity of each particle is then changed towards p and $p_g$ in a probabilistic way according to:

$$v_i(t+1) = w v_i(t) + c_1 \phi_1 [p_1(t) - x_i(t)] + c_2 \phi_2 [p_g(t) - x_i(t)],$$

$$x_i(t+1) = x_i(t) + \chi v_i(t+1)$$

where $x_i(t)$ and $v_i(t)$ are the position and velocity vectors at time t of the i-th particle and $c_1$ and $c_2$ are parameters that weight the influence of their respective terms in the velocity update equation, w is a decay constant which allows the swarm to converge to a solution more quickly, $\phi_1$ and $\phi_2$ are random numbers between 0 and 1 that introduce a degree of random exploration, and $\chi$ is a parameter that controls the convergence properties of the swarm.

The above PSO dynamics reflect a socio-psychological model where individual particles change their beliefs in accordance with a combination of their own experience and the best experience of the group. This is in contrast to other models of cognition where an individual changes his beliefs to become more consistent with his own experience only. The random element introduces a source of noise which enables an initial random search of the solution space. The search then becomes more directed after a few iterations as the swarm starts to concentrate on more favorable regions. This type of search is much more efficient than exhaustive or gradient based search methods. PSO relies on the fact that in most practical problems the optimum solution usually has better than average solutions residing; in a volume around it. These good solutions tend to attract the particles to the region where the optimum lies. The swarm becomes more and more concentrated until the optimum is found (e.g., $p_g$ no longer changes). In cognitive swarms, the PSO objective function is the confidence level of an object classifier. The cognitive swarm locates objects of interest in the scene by maximizing the classifier confidence.

Figure 2:
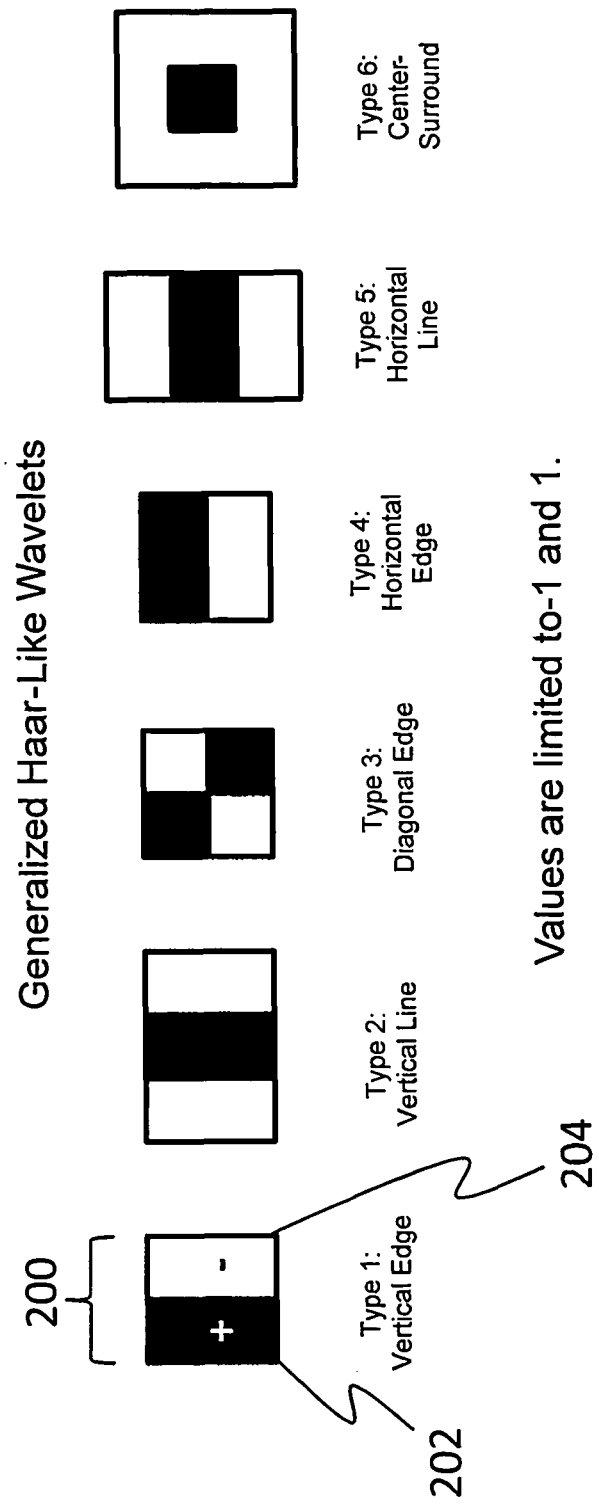
FIG. 2 is an illustration showing Generalized Haar-like Wavelets.

The feature extraction and feature value calculation stage 112 can be implemented using various types of features known in the art. As a non-limiting example. FIG. 2 provides an illustration showing, various species of Generalized Haar-like Wavelet Features. Each wavelet kernel 200 is divided into positive 202 and negative 204 sections. The wavelet kernel is correlated with the pixel values in the underlying image, then the positive 202 and negative 204 sections are summed to yield a feature value for the wavelet kernel 200. Another type of feature that can be used is Threshold Gabor Wavelet Features. Threshold Gabor Wavelets come in two types and are defined as follows:

Gabor Wavelets

Type 1: $G(x, y) = \exp\left(-\frac{(x^2 + \gamma Y^2)}{2\sigma^2}\right) \cos\left(\frac{2\pi}{\lambda} X\right)$ Type 2: $G(x, y) = \exp\left(-\frac{(X^2 + \gamma Y^2)}{2\sigma^2}\right) \sin\left(\frac{2\pi}{\lambda} X\right)$ where $X = x\cos\theta + y\sin\theta$ $Y = -x\sin\theta + y\cos\theta$ Thresholded wavelets are limited to values of −1, 0, and 1 :

$$G_{TH}(x, y) = \begin{cases} 1 & \text{if } G(x, y) >= tval \\ 0 & \text{if } -tval < G(x, y) < tval \\ -1 & \text{if } G(x, y) < -tval \end{cases}$$

The parameter tval controls how the continuously-valued version of the Gabor wavelet is converted into a thresholded version that assumes values of −1, 0, or 1 only. The Threshold Gabor Wavelet has computational advantages because multiplication is not required to calculate the feature values. All of the adjustable parameters in the above equation are optimized for high recognition rate during the classifier development process.

Figure 3:
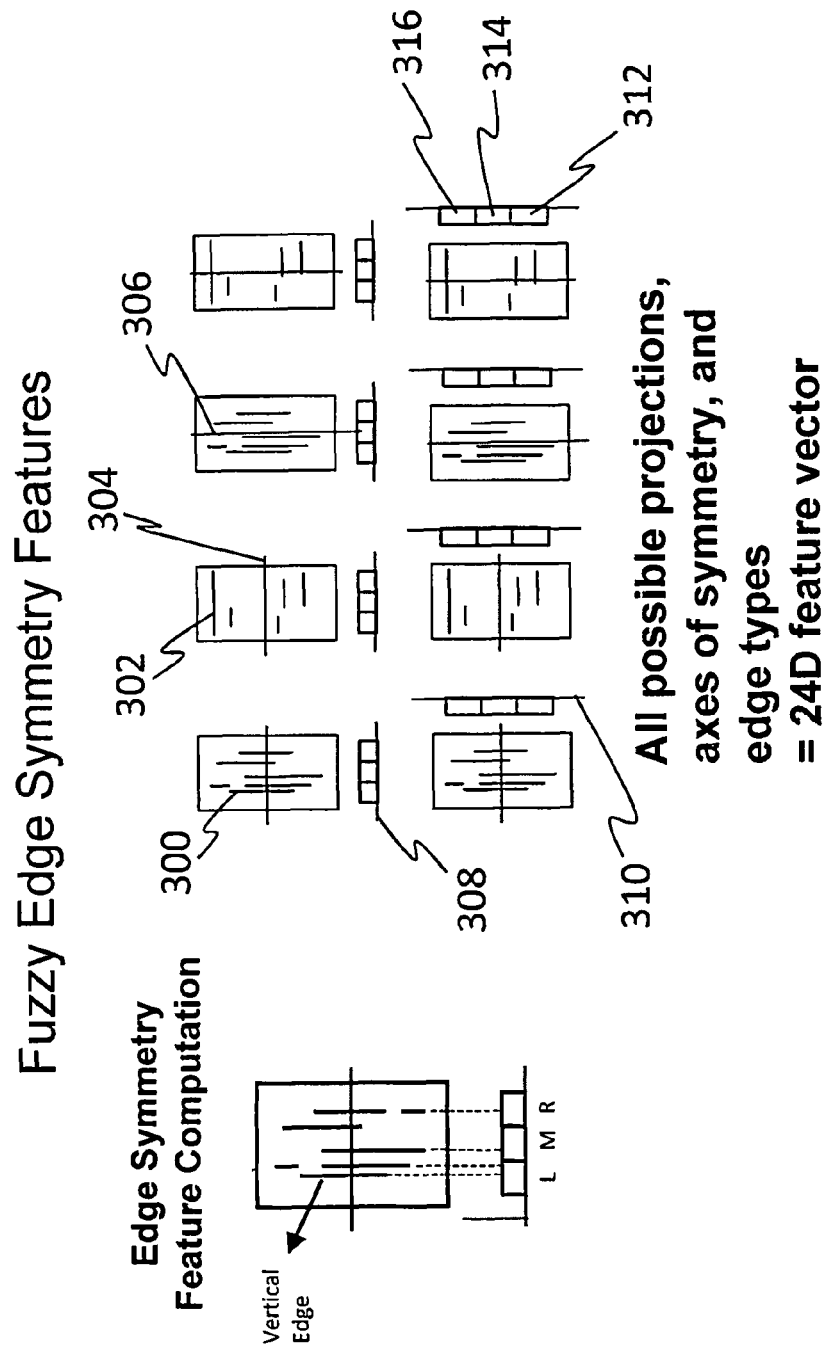
FIG. 3 is a set of illustrations showing the various combinations of Fuzzy Edge Symmetry Features.

A third possible feature set is Fuzzy Edge Symmetry Features, which is known in the art and shown in FIG. 3. Fuzzy edge symmetry attempts to classify objects based on the symmetries of their edges. The diagram shows an image containing vertical edges 300 and horizontal edges 302 being analyzed against both vertical axes 304 and horizontal axes 306, from both vertical projections 308 and horizontal projections 310, and across the fuzzy membership functions left 312, middle 314, and right 316, yielding (2 edge types)×(2 axes)×(2 projections)×(3 membership functions=24 dimensional feature.

Figure 4:
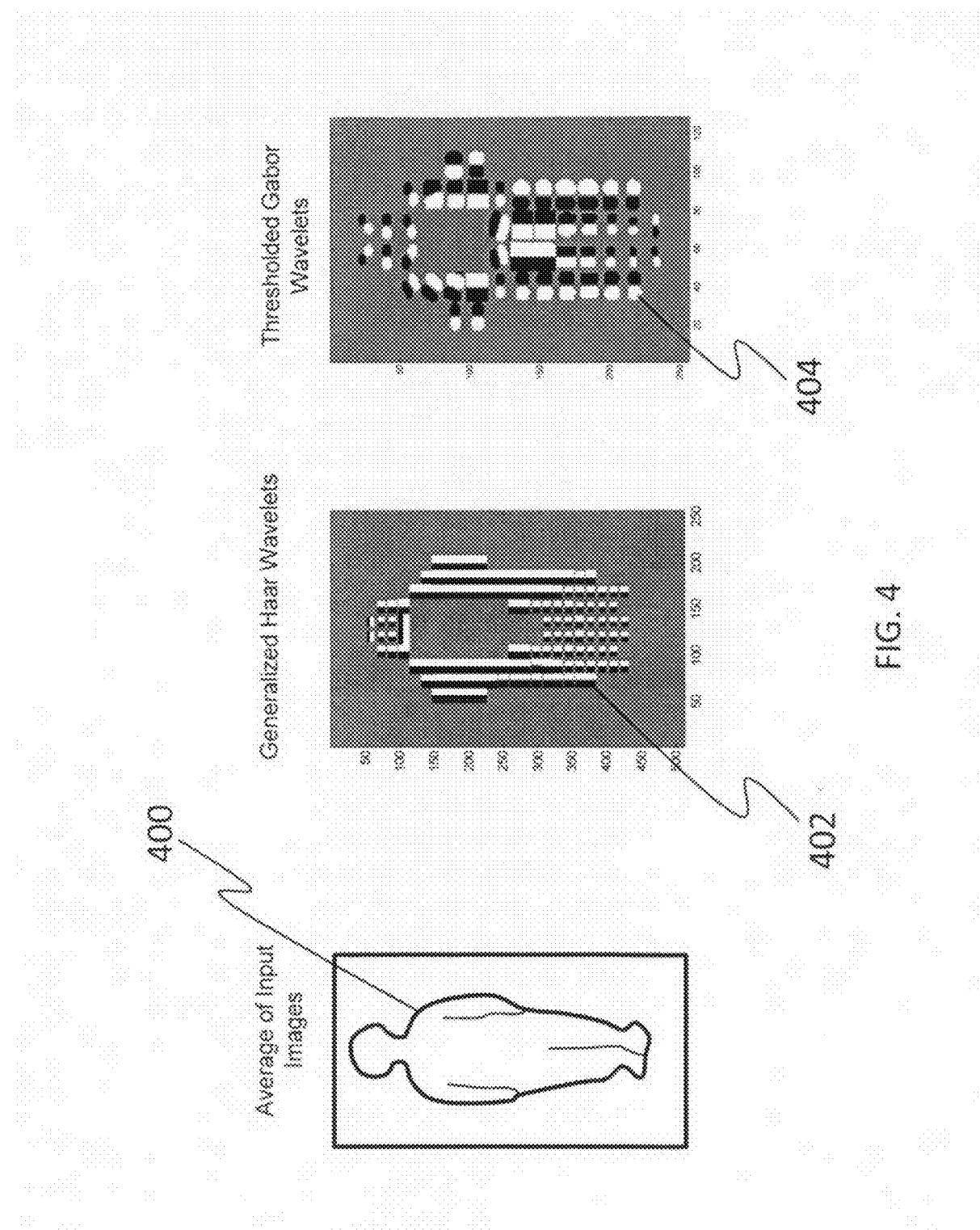
FIG. 4 is a set of illustrations showing the Haar and Thresholded Gabor wavelet features used in the human/non-human classification stage.

The feature sets used can be selected by sorting against their importance for a classification task using any of a number of techniques known in the art including, but not limited to, using metrics such as mutual information or latent feature discovery models. The feature sets used for training the first-stage classifiers are different than those used to train the second-stage classifiers. For example, wavelet feature sets for a human/non-human classification stage are shown in FIG. 4. An image of a potential human 400 is classified by analyzing, the image with Haar Wavelets 402 and Threshold Gabor Wavelets 404. Note the feature sets shown in FIG. 4 are only one example of features that can be used for object detection. As understood by one skilled in the art, the appropriate feature set to use for a given object will largely depend on the type of object being detected.

Figure 5:
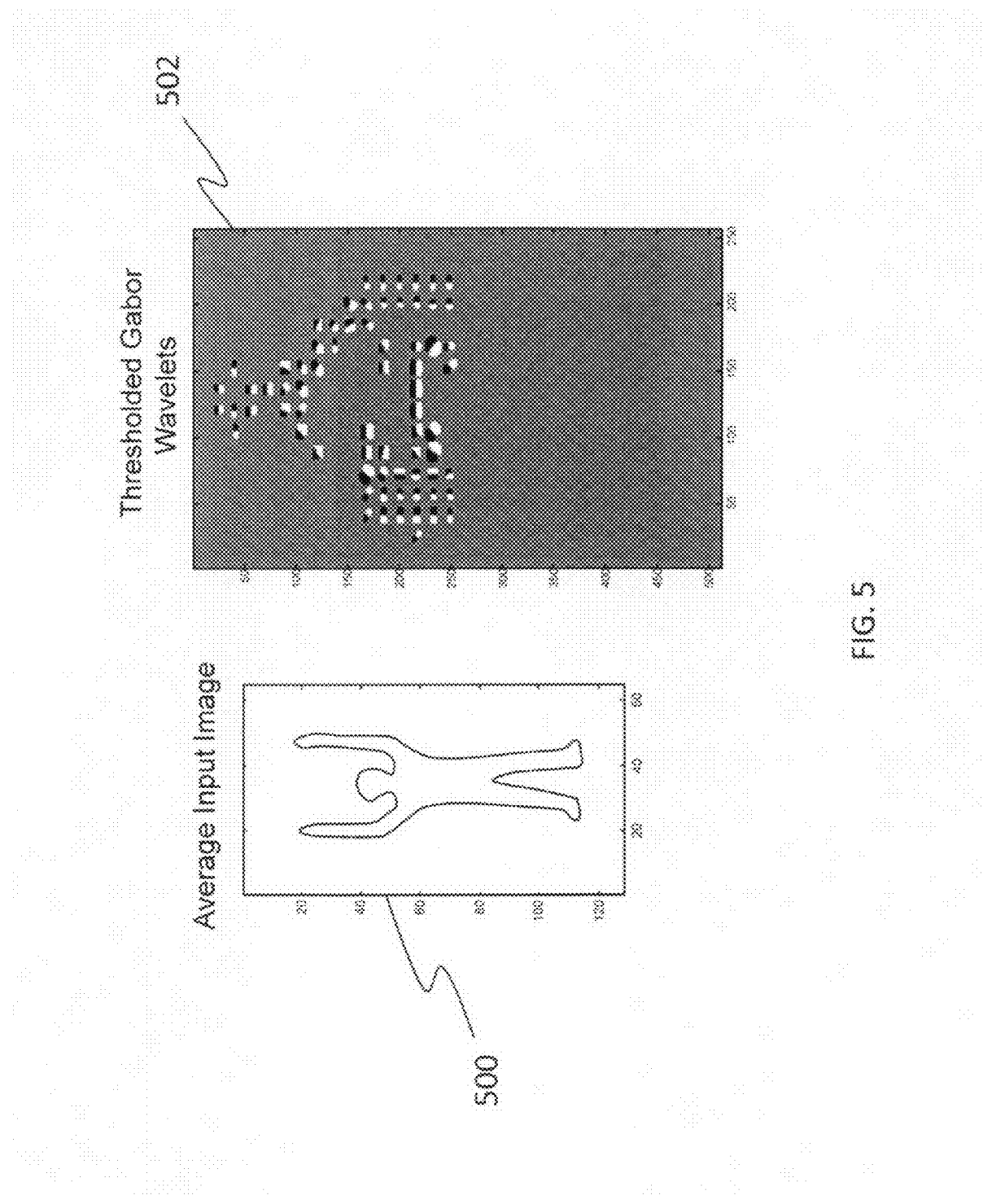
FIG. 5 is a set of illustrations showing the Thresholded Gabor wavelet features used in the specific-class classification stage.

Once an object has been identified as a member of the human class, it is sent to a second-stage classifier to identify the object as a member of a predetermined specific-class. In this case, the predetermined specific-class is a human holding his arms vertically upward, as would a football referee signaling a touchdown. FIG. 5 shows an image of a potential football referee 500 and an example of a selection of wavelets 502 for specific object detection that have objective function values above a specified threshold. FIG. 6 is an illustration showing example poses for use with the second-stage of the method according to the present invention. The examples shown are a person holding their arms outward 600, a football player in a three-point stance 602, and a person running 604.

Figure 7:
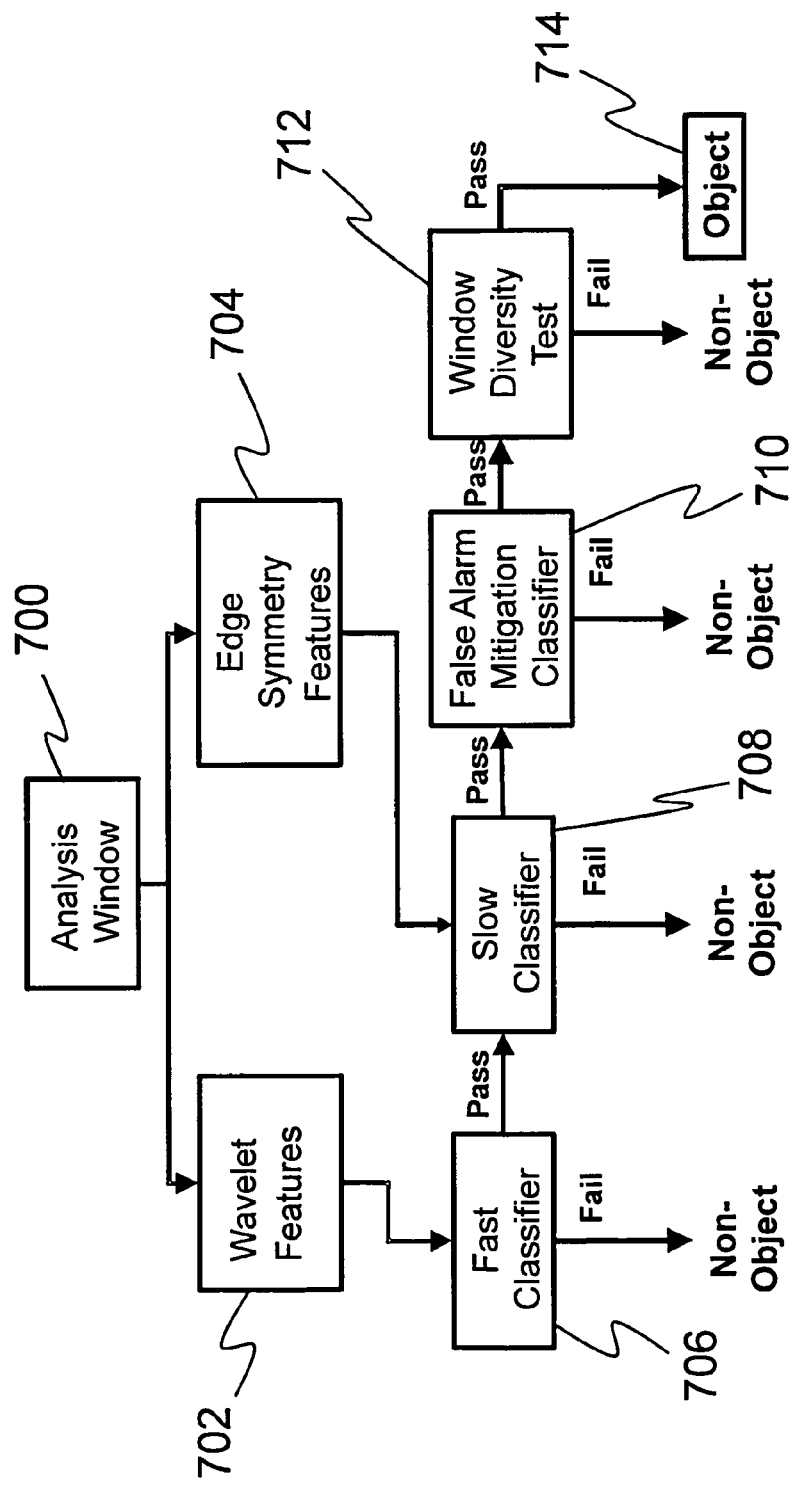
FIG. 7 is a flow diagram showing a cascade of object classifiers in accordance with the present invention.

In order to achieve both high accuracy and speed, a classifier cascade as exemplified in FIG. 7 can be used instead of a single classifier. The cascade of classifiers filters out non-objects of interest in order to achieve both fast response and low false alarm rates. Each classifier is typically a neural network. Other non-limiting examples of classifiers include k-nearest neighbors, support vector machines, and decision trees. In the cascade shown, wavelet features 702 and edge symmetry features 704 are extracted from an analysis window 700. The wavelet features 702 are fed into a fast object classifier 706, which quickly sorts out non-objects and passes on potential objects to a slow classifier 708 which analyzes the wavelet features 702 in conjunction with edge symmetry features 704, Potential objects that pass this stage are then fed through a false alarm mitigator 710 and window diversity test 712 before being output as a detected object 714. By using less accurate but faster classifiers 706 in the early stages of the cascade, non-objects of interest images can be quickly rejected. Only candidate images with higher probability of being true objects of interest are passed on to the later more accurate but also more complex classifiers 708, 710, and 712. Further details regarding the classifier cascade shown in FIG. 7 as applied to cognitive swarms can be found in U.S. patent application Ser. No. 11/367,755.

Figure 8A:
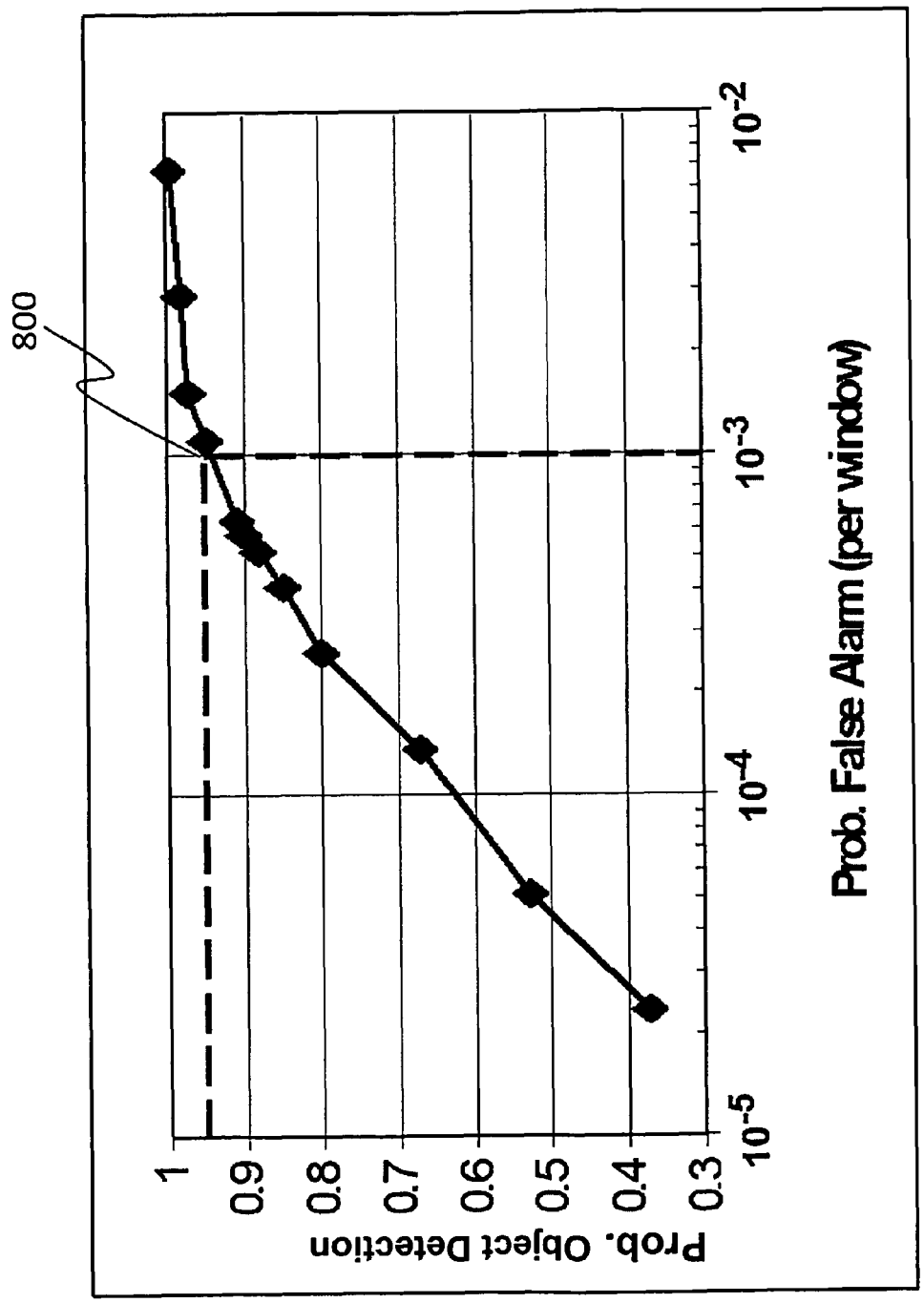
FIG. 8A is a data plot showing an experimental detection rate versus false alarm rate for the human detection stage of the method of the present invention.
Figure 8B:
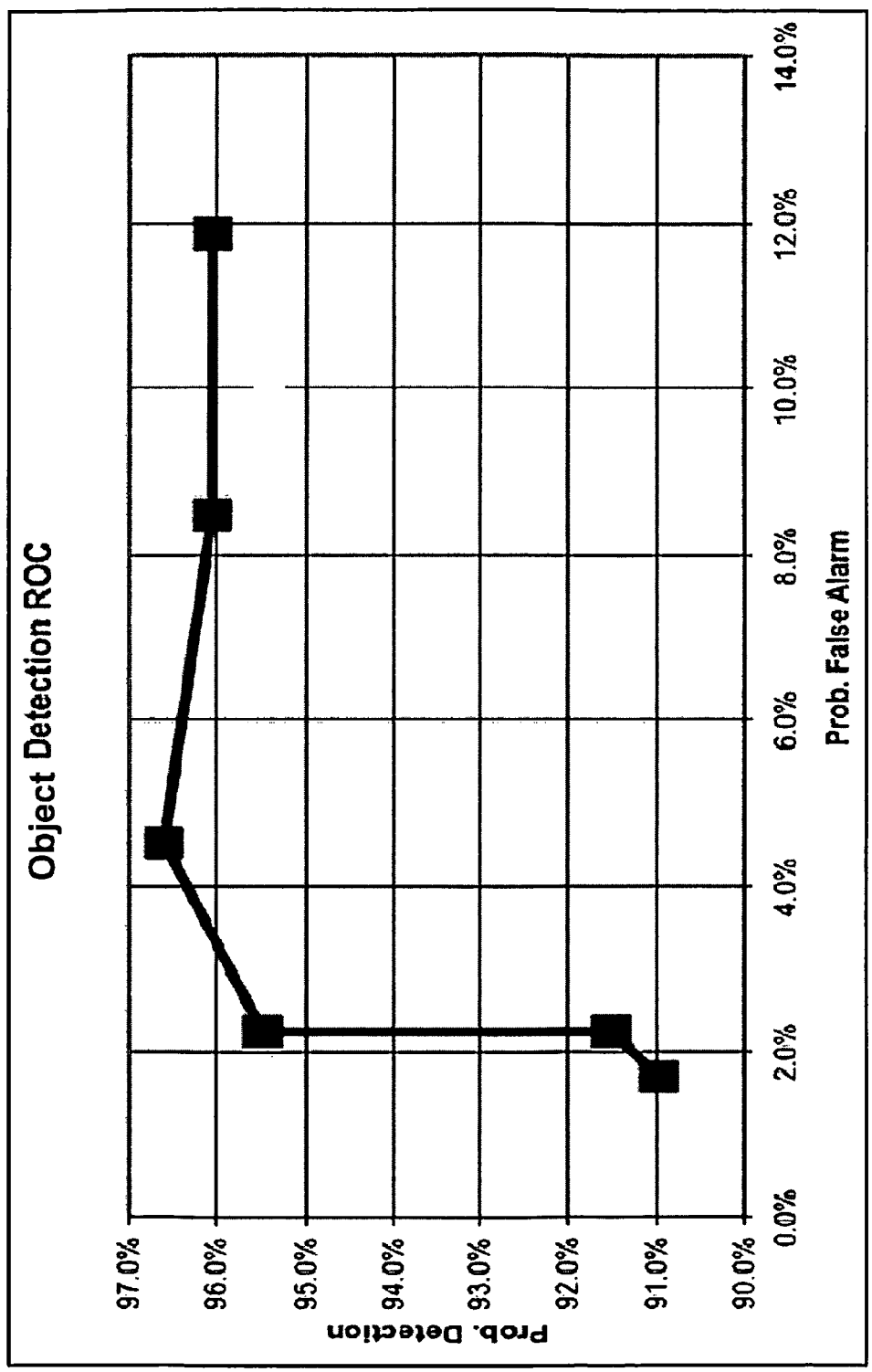
FIG. 8B is a data plot showing an experimental detection rate versus false alarm rate for the specific object detection stage of the method of the present invention.

Plots of an experimental detection rate versus false alarm rate for the two-stage classification method of the present invention are shown in FIGS. 8A and 8B. FIG. 8A shows the optimal performance point 800 of a human/non-human classifier stage while FIG. 8B shows the performance of the combination of the two classifier cascades (a human/non-human classifier followed by a specific pose/non-pose classifier). A combination of Haar wavelet, edge-symmetry features, threshold Gabor wavelet features, and a neural network classifier were used to obtain the results.

Figure 9:
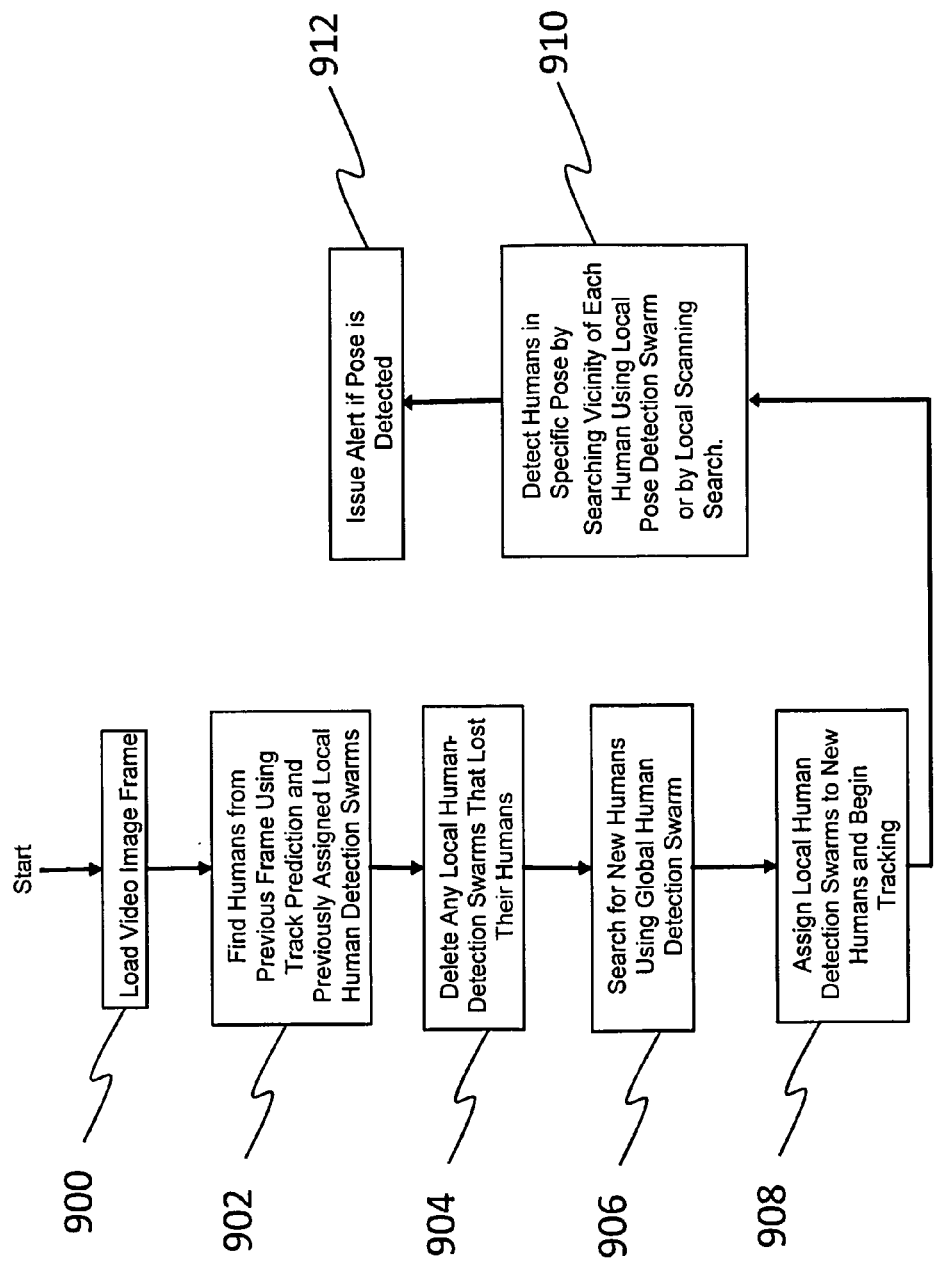
FIG. 9 is a flow diagram showing the detailed algorithm flow for the object detection system of the present invention.
Figure 10:
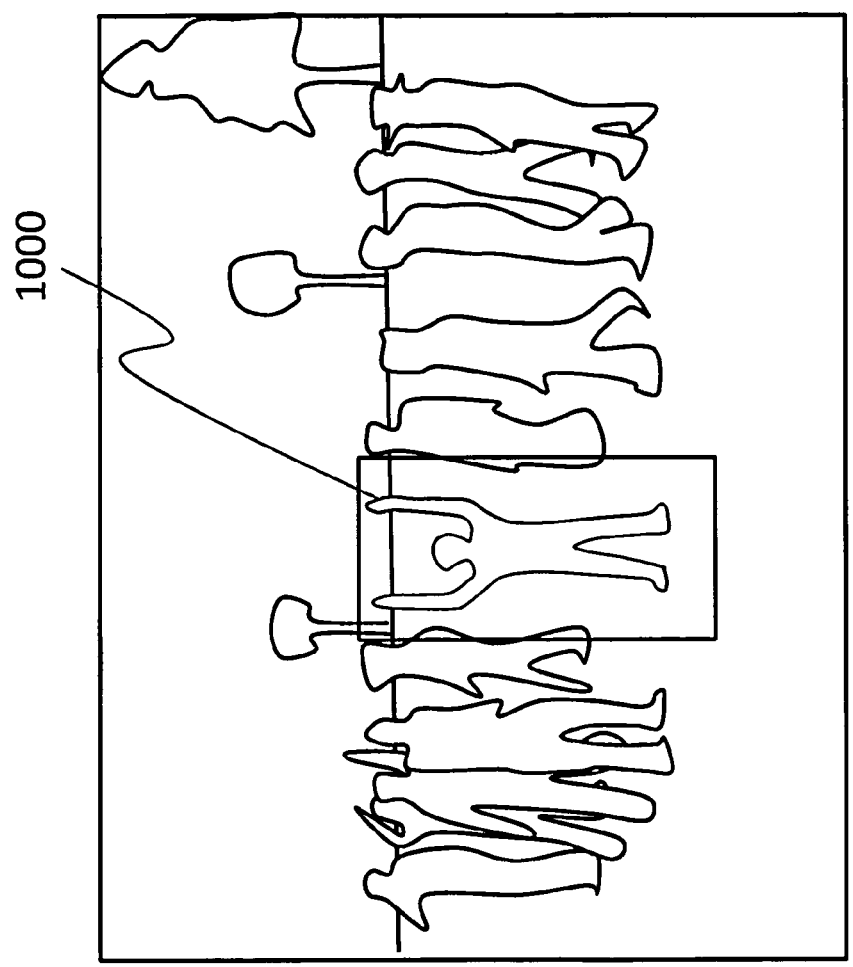
FIG. 10 is an illustration showing a human with their arms in a vertically raised pose detected in a crowd.

The detailed algorithm flow for the two-stage detection system is shown in FIG. 9. After loading a video image frame 900, previously-tracked humans are first detected using local human-classifier cognitive swarms 902 that were assigned in the previous frame. Any local swarms that are not able to find a human are deleted 904. A global human-classifier swarm 906 is then used to find any new humans that may have entered the scene. Local swarms are assigned to any new humans 908. Humans in a specific pose are then detected 910 using local pose-classifier cognitive swarms that search the local regions around the humans or, alternatively, by a simple scanning search performed in the local vicinity of the humans. The local search method which is used depends on the localization accuracy of the human-classifier cognitive swarms. If the uncertainty is relatively large, then local pose-classifier cognitive swarms should be used. An image must pass through both the human and pose detection stages in order to be recognized as a specific-class object. A visual, audio, or tactile alert is issued when a specific-class object is detected 912. An illustration showing detection of a human 1000 in a crowd holding their arms vertically upward is shown in FIG. 10.

(3) System for Automated Response to Detected Objects

Figure 11:
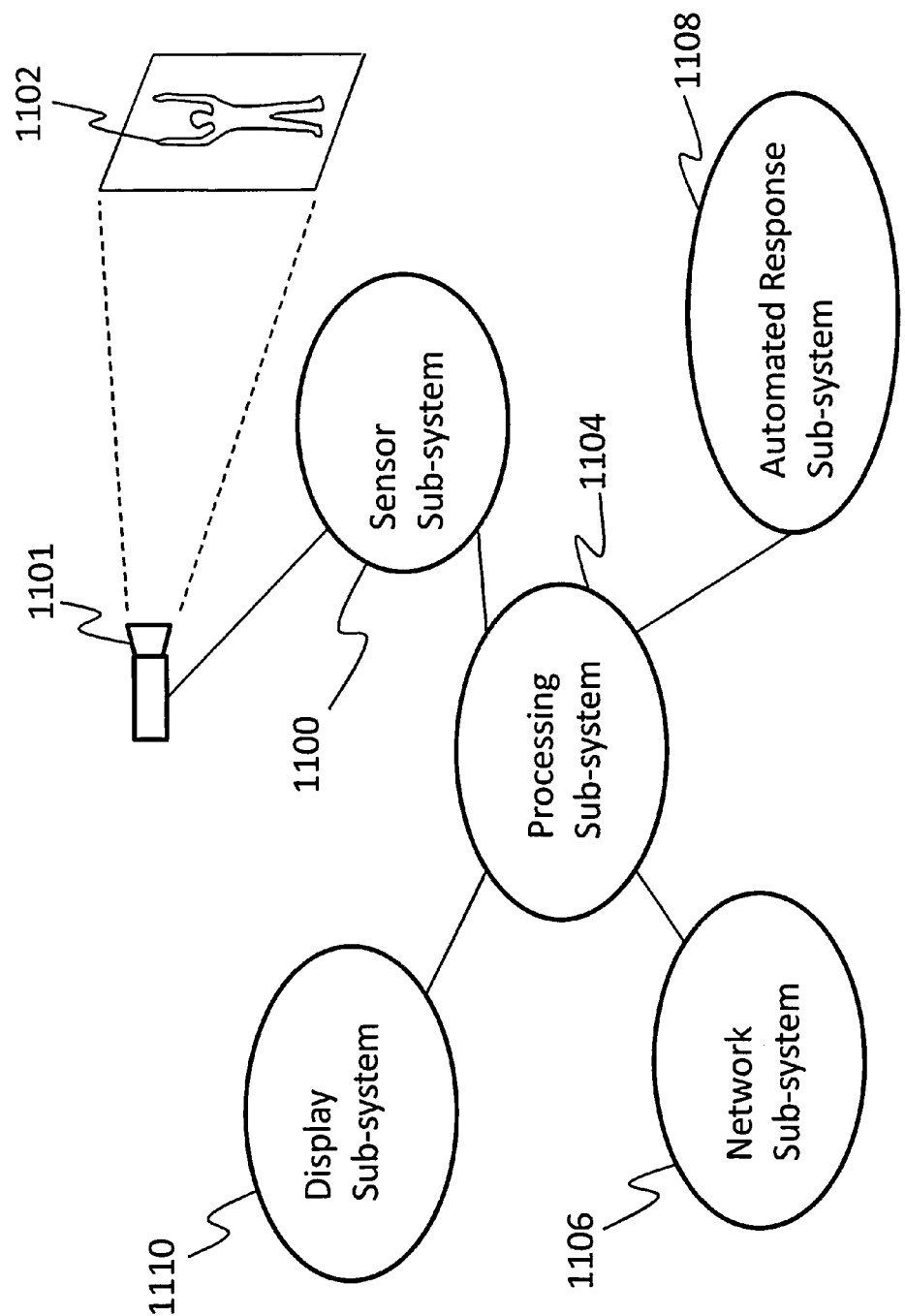
FIG. 11 is an illustration showing the various subsystems of the system of the present invention.

The present invention further incorporates the methods described above into a system for display of and automated response to, detected objects. FIG. 11 provides a detailed view of the system components. The sensor subsystem 1100 consists of the optical sensors 1101 used to detect the objects of interest 1102. The sensor subsystem 1100 could consist of a single optical sensor 1101, or an array of multiple sensors (e.g., cameras). One possible array of cameras is an array of six cameras, each with 60 degrees field of view, to provide full coverage across 360 degrees. The images sensed by the cameras are fed into a processing: subsystem 1104, where the computer vision algorithms described in section (2.0) above are used to detect and identify objects of interest 1102. If multiple sensors are used, the system will also require a networked array of multiple computers 1106 processing the camera images in parallel. The multiple computers 1106 can be connected with a master processor for coordinating results from the network of data processors. When objects of interest are detected, their locations are sent to the two output subsystems (i.e., the automated response subsystem 1108 and the display subsystem 1110).

The automated response subsystem 1108 is an optional component of this system. There may be situations in which a response to identified objects is needed faster than human operators will be able to react to any alert. Non-limiting examples of an automated response subsystem can be automatically re-directing cameras to the location of a recent play in a sporting event, automated contact with law enforcement upon detection of unauthorized personnel, or automated locking/unlocking of doors in a building.

Another system component, as shown in FIG. 11, is the display system 1110. Once an object of interest is detected, the system has to inform the operators of the location of the detected object. This information must be presented so it is intuitively and rapidly perceived with minimal cognitive effort. This can be a difficult task in situations where the system is mounted on a rapidly moving: vehicle. Typical existing methods of presenting relative location information through synthesized speech will be invalid the moment the vehicle changes direction or even continues forward for a significant distance. Instead, a graphical display method that continuously updates the object location 1102 relative to the rapidly moving vehicle is required.

Figure 12:
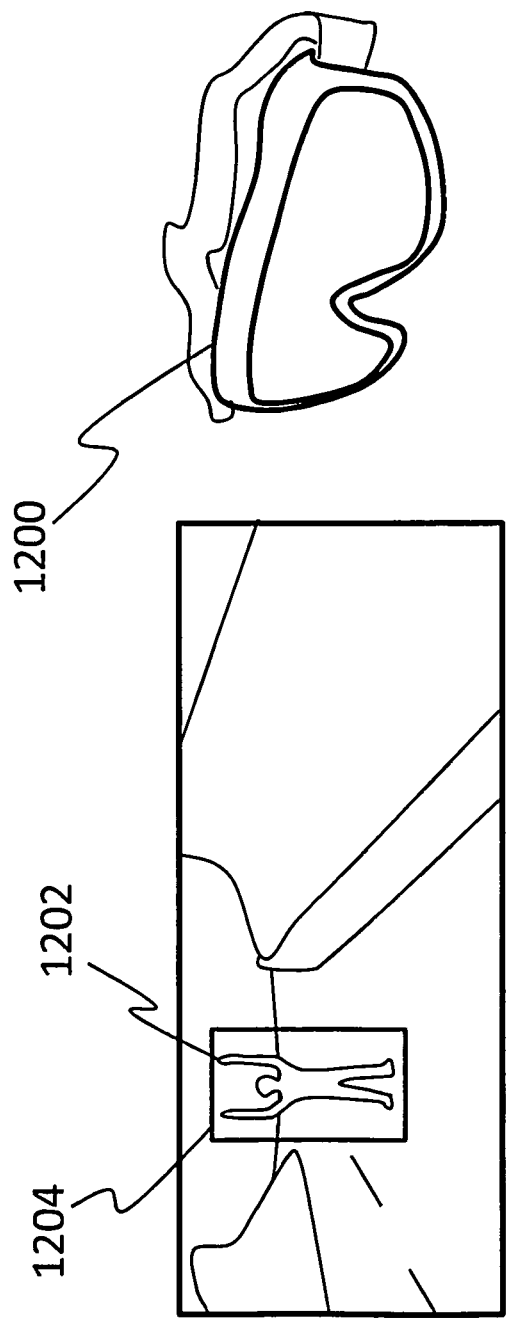
FIG. 12 is an illustration showing an example of a head-worn display worn by an operator for displaying detected object locations.

One display option is to illuminate the object with a spotlight. Another display option is to use Augmented Reality technologies to display the object location through personal head-worn displays 1200 worn by the operators, as shown in FIG. 12. The object 1202 is detected and located relative to the operator's current position. For the case of multiple operators in a single moving vehicle, each operator's display is tracked, so that their positions and orientations with respect to the vehicle are known. Thus, the system has enough information to draw a highlight 1204 in the display directly over where the operator sees the object 1202 in the real world.

Figure 13:
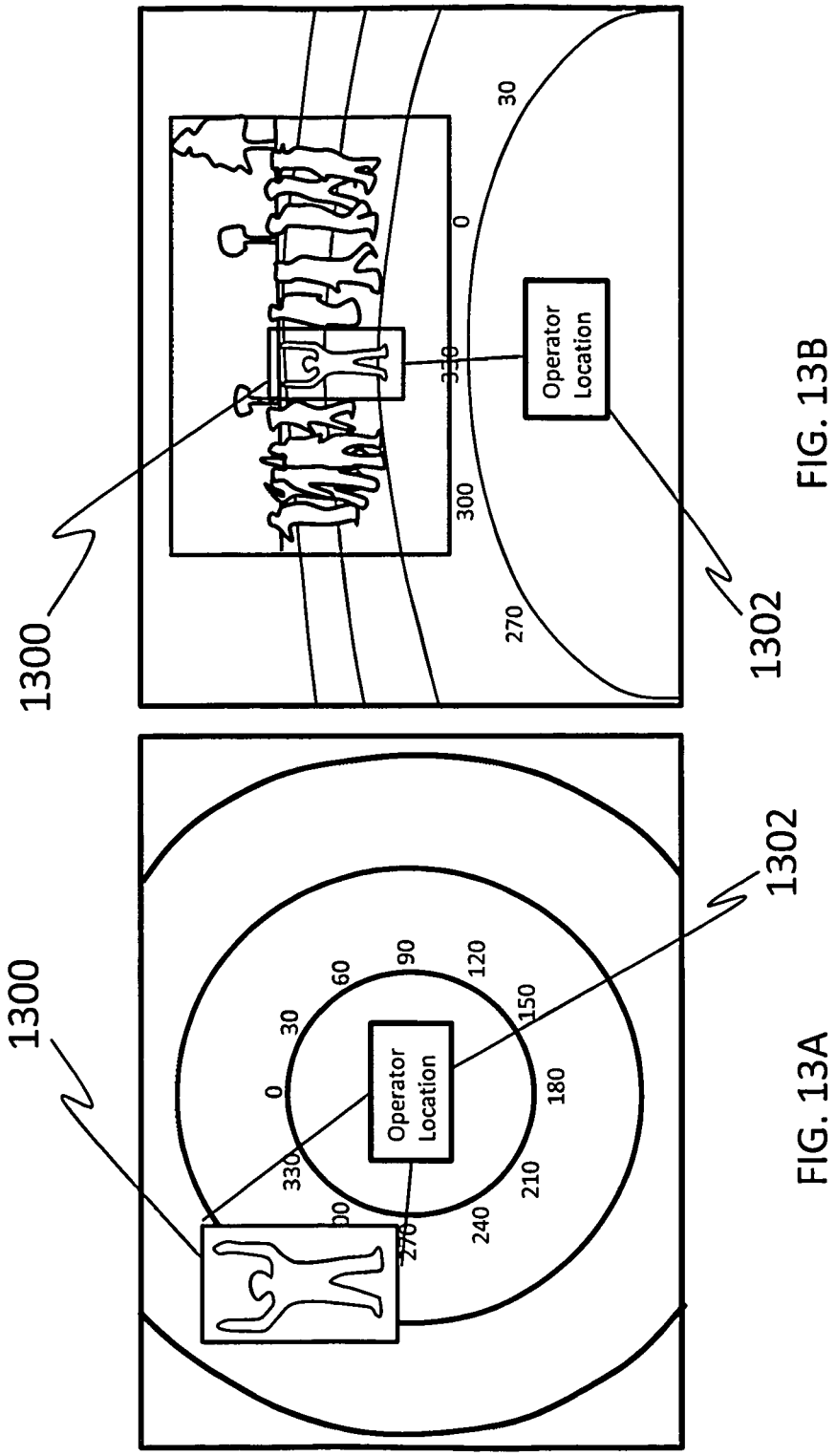
FIG. 13A is an illustration showing a two-dimensional (2-D) flat panel display unit providing a "God's eye" perspective of a detected object's location.
FIG. 13B is an illustration showing a three-dimensional (3-D) flat panel display unit providing a "God's eye" perspective of a detected object's location.

A third and more conventional display approach is to display the object information in a head-down display or on a small flat panel display, such as a personal digital assistant (PDA). Possible implementations include two-dimensional (2-D) and three dimensional (3-D) versions of such a display, as shown in FIGS. 13A and 13B, respectively. Both versions render the object position 1300 and the operator's location 1302 from a "God's eye" perspective (or any other suitable perspective). The operators can quickly look at either version and understand where the object is relative to their own position. These displays can be continuously updated for use in situations where an operator is continuously changing position or orientation.

Figure 14:
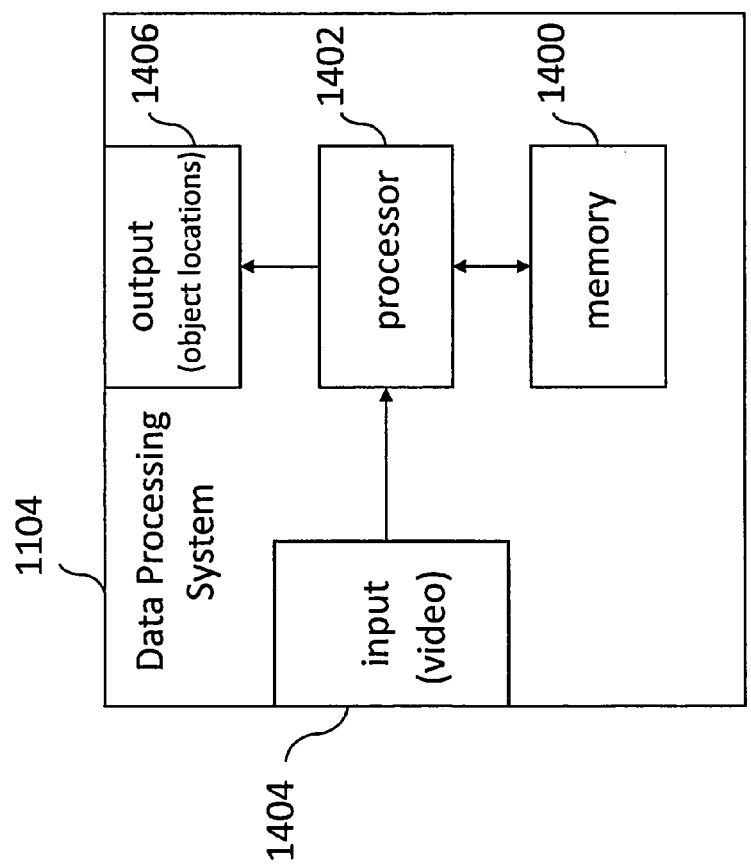
FIG. 14 is a block diagram showing a generic data processing system for use with the present invention.

The data processing system 1104 in FIG. 11 is further illustrated in FIG. 14 in generic form. The data processing system 1104 comprises a memory 1400 and a processor 1402 (or a plurality of processors). The processor(s) 1402 is configured to receive video input 1404 and output detected object locations 1406. The system is further configured to perform the acts of the method of the present invention, including: searching for members of a predetermined general-class of objects in an image, detecting members of the general-class of objects in the image, selecting regions of the image containing detected members of the general-class of objects, searching for members of a predetermined specific-class of objects within the selected regions, detecting members of the specific-class of objects within the selected regions of the image, and outputting the locations of detected objects to an operator display unit and optionally to an automatic response system. While the data processing system 1104 can be configured for specific detection of humans in certain poses, the system 1104 also can be configured for generic object detection.

Figure 15:
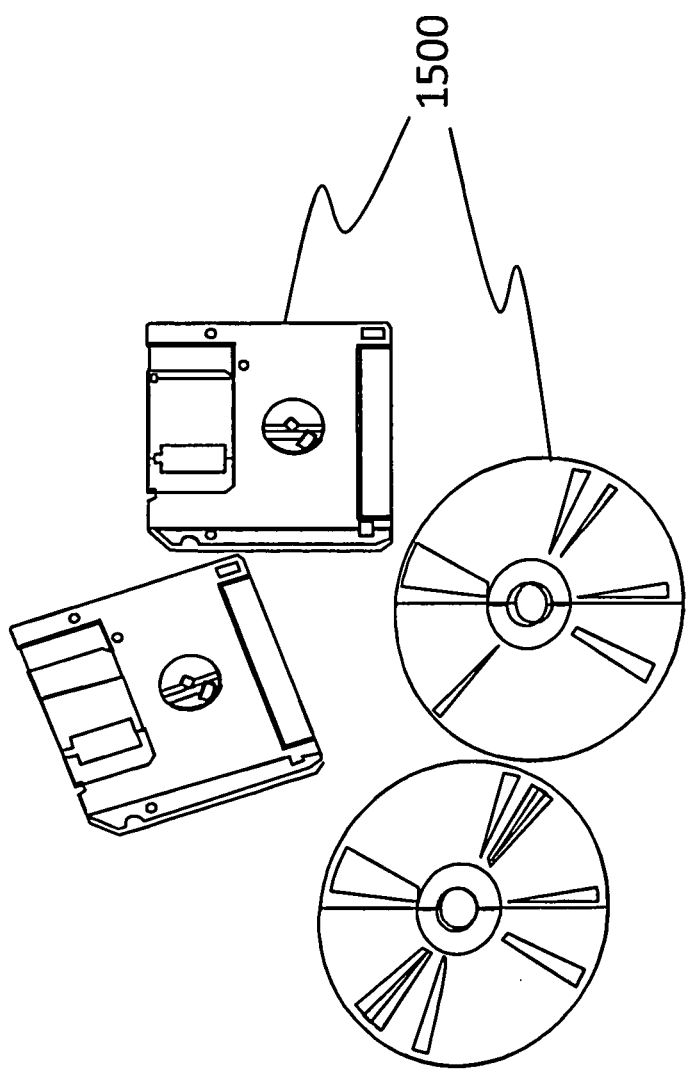
FIG. 15 is an illustration of an example of a computer program product according to the present invention.

Finally and as illustrated in FIG. 15, the present invention also comprises a computer program product 1500. The computer program product 1500 comprises computer readable instruction means encoded thereon for causing the data processing system to perform the operations described herein.

The term "instruction means" as used with respect to this invention generally indicates a set of operations to be performed on a computer (or computers), and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive. The computer program product 1500 shown in FIG. 15 is an optical disk such as a CD or DVD. However, the computer program product 1500 generally represents computer-readable instructions stored on any compatible computer-readable medium.

What is claimed is:

1. A multi-stage method of object detection, comprising:
a first stage, the first stage comprising acts of:
searching for members of a predetermined general-class of objects in an image using cognitive swarm;
detecting members of the general-class of objects in the image; and
selecting regions of the image containing detected members of the general-class of objects; and
a second stage, the second stage comprising acts of:
searching for members of a predetermined specific-class of objects within the selected regions; and
detecting members of the specific-class of objects within the selected regions of the image, whereby members of the specific-class of objects are located in the image.

2. The method of claim 1, wherein when searching for members of a predetermined general-class of objects, the general-class of objects is humans, and when searching for members of a predetermined specific-class of objects, the specific-class of objects is humans in a specific pose.

3. The method of claim 2, further comprising an act of cueing an operator with the locations of detected members of the specific-class of objects.

4. The method of claim 3, further comprising an act of cueing an automatic response system with the locations of detected members of the specific-class of objects.

5. The method of claim 4, wherein searching, for members of the predetermined specific-class is performed by a search method selected from a group consisting of a cognitive swarm and a scanning search.

6. The method of claim 1, further comprising art act of cueing an operator with the locations of detected members of the specific-class of objects.

7. The method of claim 1, further comprising an act of cueing an automatic response system with the locations of detected members of the specific-class of objects.

8. The method of claim 1, wherein searching for members of the predetermined specific-class is performed by a search method selected from a group consisting of a cognitive swarm and a scanning search.

9. A data processing system for multi-stage object detection, the system having one or more processors configured to:
search for members of a predetermined general-class of objects in an image using, a cognitive swarm;
detect members of the general-class of objects in the image;
select regions of the image containing detected members of the general-class of objects;
search for members of a predetermined specific-class of objects within, the selected regions; and detect members of the specific-class of objects within the selected regions of the image.

10. The data processing system of claim 9, where the general-class of objects is humans, and where the specific-class of objects is humans in a specific pose.

11. The data processing system of claim 10, further configured to output locations of detected members of the specific-class of objects to an operator display unit.

12. The data processing system of claim 11, further configured to output locations of detected members of the specific-class of objects to an automatic response subsystem.

13. The data processing system of claim 12, wherein the search for members of the predetermined specific-class is performed by a search method selected from a group consisting of a cognitive swarm and a scanning search.

14. The data processing system of claim 9, further configured to output locations of detected members of the specific-class of objects to an operator display unit.

15. The data processing system of claim 9, further configured to output locations of detected members of the specific-class of objects to an automatic response subsystem.

16. The data processing system of claim 9, wherein the search for members of the predetermined specific-class is performed by a search method selected from a group consisting of a cognitive swarm and a scanning search.

17. A system for multi-stage object detection, comprising:
at least one optical sensor for imaging a scene;
a data processing sub-system having one or more processors configured to receive at least one image from the at least one optical sensor and being further configured to:
search for members of a predetermined general-class of objects in an image using a cognitive swarm;
detect members of the general-class of objects in the image;
select regions of the image containing detected members of the general-class of objects;
search for members of a predetermined specific-class of objects within the selected regions; and
detect members of the specific-class of objects within the selected regions of the image; and
an operator display sub-system configured to receive locations of detected members of the specific-class of objects from the data processing sub-system and alert an operator to the locations of the detected members of the specific-class of objects.

18. The system of claim 17, where the general-class of objects is humans, and where the specific-class of objects is humans in a specific pose.

19. The system of claim 18, wherein the operator display sub-system is operable in a manner selected from a group consisting of illuminating, the object, displaying the object location through personal head-worn displays, and displaying the object location, on a flat panel display.

20. The system of claim 19, wherein the at least one optical sensor comprises a plurality of optical sensors, the data processing subsystem comprises a network of data processors configured to process the images from the plurality of optical sensors in parallel, and the network of data processors are connected with a master processor for coordinating results from the network of data processors.

21. The system of claim 20, further comprising an automatic response sub-system configured to receive locations of detected members of the specific-class of objects from the data processing sub-system.

22. The system of claim 21, wherein the search for members of the predetermined specific-class is performed by a search method selected from a group consisting of a cognitive swarm and a scanning search.

23. The system of claim 17, wherein the operator display sub-system is operable in a manner selected from a group consisting of illuminating the object, displaying the object location through personal head-worn displays, and displaying the object location on a flat panel display.

24. The system of claim 17, wherein the at least one optical sensor comprises a plurality of optical sensors, the data processing subsystem comprises a network of data processors configured to process the images from the plurality of optical sensors in parallel, and the network of data processors are connected with a master processor for coordinating results from the network of data processors.

25. The system of claim 17, further comprising an automatic response sub-system configured to receive locations of detected members of the specific-class of objects from the data processing, sub-system.

26. The system of claim 17, wherein the search for members of the predetermined specific-class is performed by a search method selected from a group consisting of a cognitive swarm and a scanning search.

27. A computer program product for multi-stage object detection, the computer program product comprising computer-readable instruction means stored on a non-transitory computer-readable medium that are executable by a computer for causing the computer to:
search for members of a predetermined general-class of objects in an image using, a cognitive swarm;
detect members of the general-class of objects in the image;
select regions of the image containing detected members of the general-class of objects;
search for members of a predetermined specific-class of objects within the selected regions; and
detect members of the specific-class of objects within the selected regions of the image.

28. The computer program product of claim 27, where the general-class of objects is humans, and where the specific-class of objects is humans in a specific pose.

29. The computer program product of claim 28, further including instruction means for causing the computer to output locations of detected members of the specific-class of objects to an operator display unit.

30. The computer program product of claim 29, further including, instruction means for causing the computer to output locations of detected members of the specific-class of objects to an automatic response subsystem.

31. The computer program product of claim 30, wherein the search for members of the predetermined specific-class is performed by a search method selected from a group consisting of a cognitive swarm and a scanning search.

32. The computer program product of claim 27, further including instruction means for causing the computer to output locations of detected members of the specific-class of objects to an operator display unit.

33. The computer program product of claim 27, further including instruction means for causing the computer to output locations of detected members of the specific-class of objects to an automatic response subsystem.

34. The computer program product of claim 27, wherein the search for members of the predetermined specific-class is performed by a search method selected from a group consisting of a cognitive swarm and a scanning search.

* * * * *